F. W. FORT & H. T. CRUGER.
NUTCRACKER.
APPLICATION FILED OCT. 7, 1907.
964,414.
Patented July 12, 1910.
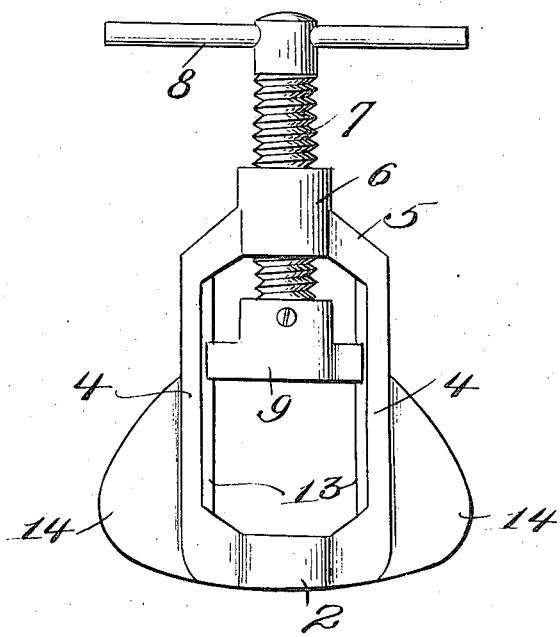
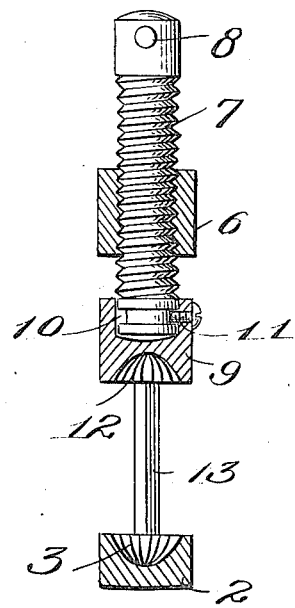
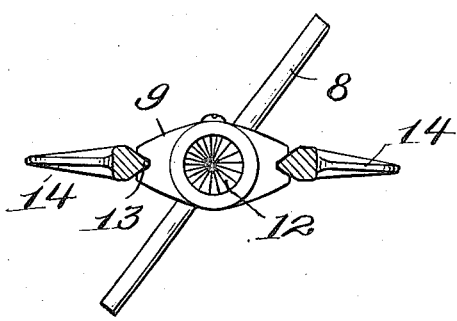
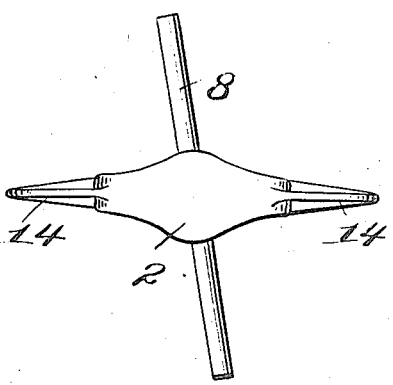
Witnesses:
Inventors:
Foster W. Fort
Harry T. Cruger
By James L. Norris
Atty.

UNITED STATES PATENT OFFICE.

FOSTER W. FORT AND HARRY T. CRUGER, OF WACO, TEXAS.

NUTCRACKER.

964,414.   Specification of Letters Patent.   Patented July 12, 1910.

Application filed October 7, 1907. Serial No. 396,253.

*To all whom it may concern:*

Be it known that we, FOSTER W. FORT and HARRY T. CRUGER, citizens of the United States, residing at Waco, in the county of McLennan and State of Texas, have invented new and useful Improvements in Nutcrackers, of which the following is a specification.

This invention relates to nut crackers, the object of the invention being to provide an effective article of this character which consists of few parts and which can be inexpensively made.

The device is adapted for cracking all kinds of nuts, but more especially those that are round or oblong, and in action the nuts are so broken or caused to bulge out that the meats or kernels thereof can be removed in unbroken or whole condition.

In the drawings accompanying and forming a part of this specification, we show in detail certain advantageous forms of embodiment of the invention which, to enable those skilled in the art to practice the same, will be set forth in detail in the following description, while the novelty of the invention will be included in the claims succeeding said description.

The nut cracker herein described involves in its make-up a relatively fixed or stationary jaw and a movable jaw, the latter being operable by a screw so that the exact amount of movement of the movable jaw necessary to break a nut can be caused, which operation cannot ordinarily be performed in nut crackers wherein one or the other members thereof are directly operable by a lever, as in such lever motion there is generally overthrow or excessive movement of the operative jaw which causes the breaking of the kernel or meat of the nut.

Referring to said drawings: Figure 1 is an elevation of said nut cracker. Fig. 2 is a longitudinal sectional view. Fig. 3 is a transverse sectional view looking toward the top. Fig. 4 is a bottom plan view of said nut cracker.

Like characters refer to like parts throughout the several figures.

The nut cracker represented in the drawings includes in its construction a relatively fixed or stationary jaw, as 2, and this jaw 2 is represented as having in the upper side thereof a concavity or depression 3, constituting a seat for the nut to be cracked. From opposite sides of the jaw 2 there are shown as rising two parallel arms, each denoted by 4, and represented as connected at their upper ends by the transverse member or bridge piece 5, said transverse member or bridge piece and the two arms presenting a substantially yoke-like structure. The transverse member or bridge piece 5 is shown as having formed therewith the hub or sleeve 6, which is internally threaded to receive and to constitute a feed nut for the screw 7, which latter may be operated in any desirable way, for example, by the arm or hand lever 8, attached thereto in any suitable manner. By the manipulation of the hand lever or arm 8 the screw 7 will be moved longitudinally owing to its association with the feed nut 6. The hand lever or arm 8 comprises two branches which extend equidistantly from the outer or upper end of the screw 7.

In addition to the relatively fixed or stationary jaw 2, the implement is provided with a movable jaw, as 9, which is shown as swiveled to the lower or inner end of the feed screw 7, the lower end of said screw fitting into a counterbore in the upper side of said jaw 9, and having a peripheral channel, as 10, to receive the screw 11 tapped through the upper portion of said movable jaw 9. In the underside of said movable jaw is a concavity or pocket 12, complemental to the concavity 3, and which receives the upper portion of a nut during the cracking operation. During this cracking operation the nut is situated in the mating concavities 3 and 12, the latter coacting to prevent positively any side motion of the nut. The arms 4 are shown as furnished on their inner sides with ribs or tongues, as at 13, which may, as shown, be V-shaped in cross section and which are adapted to enter grooves or channels in the lower laterally widened portions of the movable jaw 9, whereby said jaw is accurately guided during its advancing and retracting movements under the action of the screw 7 and coöperating feed nut 6.

On the outer sides of the jaw 2, and lower portion of the arms 4, we have shown wings or fins 14, which are of duplicate construction and which are to facilitate the hold of a user of the device. These fins or wings 14 are grasped by one hand while the other hand can be utilized for operating the lever or arm 8 to move the jaw 9 forward or downward or backward. These wings 14 also reinforce the lower jaw 2 and act in addition as guards to prevent the fingers of the user from coming in contact with the jaw 9 on the downward or forward movement thereof. The jaw 2, arms 4, bridge piece 5, nut 6, and wings 14 may be, if desired, and preferably are, made integral; they may be made in any suitable way, for instance, by casting. There are, therefore, only five parts in the apparatus, and these parts can be easily assembled.

In operation the wings or fins 14 will be grasped and a nut will be placed in the concavity or depression 3 of the jaw 2, the jaw 9 at this time being up. The jaw 9 will then be lowered by the operation of the lever 8 in the manner hereinbefore described until the upper portion of the nut is received in the concavity 12. The downward motion of said jaw 9 will then be continued until the said jaw 9 firmly engages the nut. On the continued movement of the said jaw 9 the nut will be fractured and this movement can be so regulated or governed that the nut will not be unduly broken, as in case it is the meat or kernel of the nut would be crushed or broken.

The immovable or fixed jaw and the movable jaw are provided with pockets in their opposing portions to inclose opposite extremities of a nut and hold the latter in longitudinal relation to the cracker so that a crushing strain may be exerted longitudinally of the nut. Each of the pockets as shown in the drawings is provided with surface means for preventing the nut from slipping or rolling out of place, such displacement of the nut being liable to occur when the shell is hard and thick. A material advantage also results in exerting on a nut a crushing strain longitudinally of the nut in that the kernel is more fully loosened and may be easily removed when the nut is released from the cracker. In those devices in which nuts are crushed or cracked by a pressure exerted on the sides of the nut, or in devices where no means are provided for positively holding a nut to impose thereon a crushing strain longitudinally of the nut, the kernel becomes broken and the shell of the nut is not fractured in such manner as to render the removal of the kernel satisfactory, and it is necessary to resort to the use of nut picks to complete the removal of the kernel. When the movable jaw is moved toward the companion immovable or fixed jaw, that part of the nut held between the two jaws is caused to bulge outward or laterally in all directions in view of the longitudinal crushing strain exerted on the nut.

The device is particularly adapted for cracking all kinds of nuts, such as pecans, butternuts, Brazil nuts, English walnuts, filberts, and almonds. In the case of a pecan nut, for example, the opposite ends thereof are placed in the two pockets of the jaws, one end being first positioned in one pocket and the opposite end directed and moved toward the other pocket; or if the one end of this particular kind of nut be first placed in the immovable jaw it will be held in such position until the movable jaw is brought into engagement with the opposite end or until the latter end enters the pocket of the movable jaw. The motion of the relatively movable jaw is continued rather rapidly, and the nut has the intermediate part thereof or that not restrained by the pockets bulged or forced outwardly without crushing or injuring the kernel, which can be easily removed when the nut is released from the jaws.

The pockets are each shown as having their surfaces interrupted by means extending from the apex to the mouth of the pocket, which renders the pockets and jaws much more effective in retaining the nut in longitudinal position with relation to the cracker than if the surfaces of the pockets were smooth. The dimensions of the pockets should be such as to receive and snugly embrace the ends of the nut, as it has been found that a concaved surface without positive restriction or contour is not effective in preventing a nut from rolling, and, furthermore, by the use of a concaved surface without a contour adapted to hold or snugly embrace the end of the nut it would require a very tedious manipulation for an operator to endeavor to hold a nut in place in contact with one jaw while the opposite jaw was being moved to engage the nut.

What we claim, is:

1. A nut cracker comprising a frame carrying a fixed jaw at one extremity and having arms extending in parallel relation, a movable jaw mounted between said arms and having guide means engaging the latter to prevent rotation of the said jaw, the two jaws having complemental nut-receiving pockets, a nut at the extremity of the frame opposite that carrying the fixed jaw, a feed-screw extending through the nut and swiveled to said movable jaw and provided with operating means, and lateral wings at opposite sides of the frame and extending from the fixed jaw to a point about midway of the arms, the said wings consisting of flat extensions converging toward their outer edges.

2. A nut cracker comprising a supporting frame having a relatively stationary jaw at one extremity and lateral wings extending from opposite portions of said frame from a point adjacent to the said jaw to about midway of the frame, the said wings having their greatest width at a point adjacent to the stationary jaw to provide a holding means for the cracker near said jaw, a movable jaw mounted in the frame in alinement with the stationary jaw, the two jaws having complemental nut-receiving pockets, and means supported by the frame for operating the movable jaw.

In testimony whereof we have hereunto set our hands in presence of two subscribing witnesses.

FOSTER W. FORT.
HARRY T. CRUGER.

Witnesses:
Roy A. German,
H. M. Mimer.